United States Patent [19]

Anderson et al.

[11] Patent Number: 5,135,360

[45] Date of Patent: Aug. 4, 1992

[54] METHOD AND DEVICE FOR CONTROLLING TANK VAPORS ON A PETROLEUM STORAGE TANK

[76] Inventors: R. David Anderson, 110 Pembroke, Wichita Falls, 76301; George S. Jacobs, P.O. Box 4743, Wichita Falls, Tex. 76308

[21] Appl. No.: 640,971

[22] Filed: Jan. 14, 1991

[51] Int. Cl.$^5$ .............................................. F04B 23/02
[52] U.S. Cl. ...................................... 417/53; 137/488; 417/295
[58] Field of Search ................ 417/53, 295; 137/488, 137/489

[56] References Cited

U.S. PATENT DOCUMENTS

| | | |
|---|---|---|
| 1,311,536 | 7/1919 | Smoot . |
| 1,906,651 | 5/1933 | Spence . |
| 2,631,606 | 3/1953 | Parks . |
| 3,021,865 | 2/1962 | Beckett . |
| 3,477,456 | 11/1969 | Powell . |
| 3,669,143 | 6/1972 | Reese . |
| 3,805,823 | 4/1974 | Kakegawa . |
| 3,815,329 | 6/1974 | Pande-Rolfsen ..................... 417/279 |

Primary Examiner—Richard A. Bertsch
Assistant Examiner—David W. Scheuermann
Attorney, Agent, or Firm—Charles D. Gunter, Jr.

[57] ABSTRACT

A device and method are shown for controlling tank vapors on a petroleum storage tank of the type having a tank vapor line which runs to a suction scrubber. The scrubber being connected by conduit to a reciprocating compressor which, in turn, is connected to a compressed vapor discharge line for passing compressed vapors to a gas sales line. The reciprocating compressor is operated to draw tank vapor through the suction scrubber and through the reciprocating compressor to discharge vapor through the compressed vapor discharge line. A pneumatic control valve is installed in the tank vapor line for controlling the flow of tank vapors to the suction scrubber. A pilot valve is provided as a part of the pneumatic control valve for controlling the operation of the control valve. The control valve is operated to maintain a vacuum in the tank vapor line between the control valve and the suction scrubber to eliminate the tendency of tank vapor to liquify in the tank vapor line.

14 Claims, 2 Drawing Sheets

METHOD AND DEVICE FOR CONTROLLING TANK VAPORS ON A PETROLEUM STORAGE TANK

BACKGROUND OF THE INVENTION

1. Field of the Invention

The present invention relates generally to pressure regulating devices and methods and specifically to a method and device for regulating the collection of tank vapor within a petroleum storage tank in order to recover the tank vapor for delivery to a gas sales line.

2. Description of the Prior Art

The product from a typical petroleum producing well is first passed to an oil and gas separator, with the liquid petroleum being passed to a petroleum storage tank. The liquified portion of the tank contents are periodically emptied and transported by a tank truck.

While pentane and heavier components of the tank contents are typically liquid, there is always a vapor head within the tank resulting from the lighter components present. Vapor recovery units have been popular for a number of years. These units collect the tank vapor and compress the vapor to the point that it can be delivered to a gas sales line, where the vapor is sold in the gaseous state.

The prior art vapor recovery methods have suffered from a number of deficiencies. Typically, an electric pilot valve on the top of the storage tank was actuated by a predetermined increase in tank vapor pressure. The electrically operated pilot valve closed a bypass control valve located between the scrubber unit and compressor which was used to compress the vapor prior to delivery to the gas sales line. The electrically operated pilot valve posed an electrical hazard because of its proximity to the petroleum vapor. The opening of the bypass valve between the scrubber and compressor caused a decrease in pressure in the conduit leading to the scrubber which produced a refrigeration effect, causing liquids to fall out in the scrubber. This required that liquids be pumped back to the petroleum storage tank, forming an endless loop. Because of the problem of liquid condensation, it was necessary to provide a positive slope on the conduit leading from the storage tank to the scrubber unit. This necessitated that the scrubber and compressor be located immediately adjacent the location of the storage tank. Another problem resulted from the fact that liquids tended to form in the conduit leading to the gas sales line. The orifice meter in the gas sales line did not measure liquids, resulting in a loss in sales.

The object of the present invention is to provide an improved method for controlling tank vapors on a petroleum storage tank.

Another object of the invention is to provide a method for efficiently recovering tank vapors for resale which does not increase the cost or complexity of the presently available systems.

Another object of the invention is to provide a non-electric control system, thereby eliminating fire and explosive hazards.

Another object of the invention is to provide a method for collecting tank vapors which eliminates the tendency of vapors to condense in the conduit connecting the tank to the scrubber unit, whereby the scrubber unit can be remotely located from the petroleum storage tank.

Another object of the invention is to provide an improved pneumatically operated control valve for use in controlling tank vapors on a petroleum storage tank.

SUMMARY OF THE INVENTION

The method of the invention is used to control tank vapors on a petroleum storage tank of the type having a tank vapor line running to a suction scrubber. The scrubber is connected by a conduit to a reciprocating compressor which, in turn, is connected to a compressed vapor discharge line for passing compressed vapors to a gas sales line. In the method of the invention, the reciprocating compressor is operated to draw tank vapor through the suction scrubber and through the reciprocating compressor to discharge vapor through the compressed vapor discharge line. A pneumatic control valve is provided with pilot means for controlling the operation of the pneumatic control valve. The pneumatic control valve is operated to maintain a positive pressure in the storage tank while simultaneously maintaining a vacuum in the tank vapor line between the control valve and the suction scrubber, whereby the tendency of tank vapor to liquify in the tank vapor line is decreased.

Preferably, the pneumatic control valve includes a main valve element moveable between open and closed positions for controlling the flow of tank vapor through the tank vapor line to the suction scrubber. The pneumatic control valve is provided with a pilot means connected to a source of control gas pressure which determines a set point for the control valve, whereby an increase in tank vapor pressure above the set point opens the control valve and causes the reciprocating compressor to pump relatively larger volumes of tank vapor, and whereby a decrease in tank vapor pressure below the set point closes the control valve and causes the reciprocating compressor to pump a relatively smaller volume of tank vapor.

A pneumatic motor valve, installed in the tank vapor line downstream of the pneumatic control valve, is controlled by a float actuated pneumatic switch provided in the suction scrubber, whereby any accumulation of liquid in the suction scrubber trips the float actuated pneumatic switch, thereby closing the pneumatic motor valve. The resulting increase in vacuum in the tank vapor line and vacuum scrubber serves to vaporize any liquids remaining in the vacuum scrubber.

Preferably, the pneumatic control valve has a valve housing connected to the tank vapor line leading from the tank, the housing having a valve seat located in the interior thereof and main valve element with a lower surface adapted to engage the valve seat to close the valve in the seated position and to open the valve in the unseated position. The main valve element is connected to the lower end of a valve stem which extends upwardly through an annular collar provided in the interior of the valve housing. The valve stem has an upper end which extends above the annular collar and which carries a diaphragm supporting disk. The disk has secured thereto a main operating diaphragm having upper and lower surfaces. The main operating diaphragm serves to divide that portion of the valve housing above the annular collar into upper and lower regions of a main diaphragm chamber.

The cross-sectional area of the main operating diaphragm is larger than the cross-sectional area of the main valve element, whereby the same pressure acting on the upper surface of the main operating diaphragm also acting on the lower surface of the main valve element tends to maintain the main valve element in the closed position. A control gas conduit is provided having a first and second branches, the first branch being connected to the upper region of the main diaphragm chamber, whereby the control gas pressure acts constantly on the upper surface of the main operating diaphragm. The second branch of the control gas conduit is further divided into a pilot gas conduit for supplying pilot gas to the pilot means and a reference conduit for supplying control gas to the lower region of the main diaphragm chamber.

The pilot means comprises a pilot valve having a pilot valve housing with a pilot gas inlet connected to the pilot gas conduit and a tank gas inlet which communicates with the tank vapor line. The pilot valve has a pilot valve element reciprocally mounted in the interior thereof, the valve element being reciprocable between a closed position in which the valve element closes the pilot gas inlet and an open position. The pilot valve element is pivotally connected to a diaphragm supporting disk which has secured thereto a flexible diaphragm. The flexible diaphragm is mounted within the pilot valve housing to divide the housing interior into an upper pilot housing region and a lower pilot housing region. A coil spring is mounted in the upper pilot housing region, the spring having a lower extent which acts upon an upper surface of the flexible diaphragm. The pilot valve is preferably provided with a threaded upper bore which has matingly received therein an adjustment member, the threaded adjustment of the adjustment member serving to correspondingly vary the spring tension on the upper surface of the flexible diaphragm and define a set point for the device.

Additional objects, features and advantages will be apparent in the written description which follows.

DETAILED DESCRIPTION OF THE INVENTION

Figure 1:
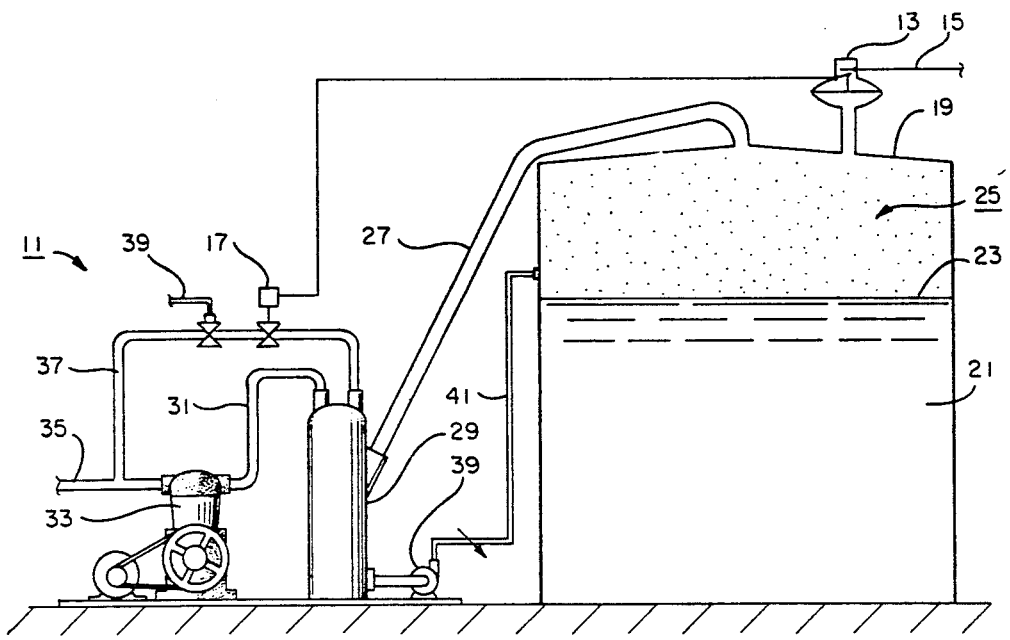
FIG. 1 is a simplified view of a prior art skid mounted vapor recovery unit featuring an electrically actuated bypass control valve.

FIG. 1 shows a prior art skid mounted vapor recovery system designated generally as 11. The vapor recovery system 11 included an electrically actuated tank pressure pilot 13 connected to an electrical source by a lead 15 and connected to an electrically actuated bypass control valve 17. The tank pressure pilot 13 was mounted on the top 19 of a petroleum storage tank 21, the tank having a liquid level 23 and a vapor head 25. The pressure pilot 13 was operated to maintain a positive pressure on the order of two ounces per square inch on the liquid 23 and within a downwardly sloping oil tank vapor line 27. The vapor line 27 ran to a scrubber unit 29 which was, in turn, connected by a conduit 31 to a reciprocating compressor 33. The compressor had a compressed vapor discharge line 35 leading to a gas sales line. A bypass line 37 communicated vapor for the discharge line 35, through a manually operated flow rate control valve 39, and through the electrically actuated bypass control valve 17 to return vapor to the scrubber unit 29.

In operation, an increase in tank pressure above the tank pressure set point (approximately 2 ounces per square inch) actuated the pressure pilot 13, causing the pilot to close the bypass control valve 17. This action allowed the compressor 33 to send vapor to the gas sales line through the discharge line 35. As the pressure in the tank began to fall, the pressure pilot 13 opened the bypass control valve 17, causing the compressor to stop sending vapor to the gas sales line. As liquid hydrocarbons accumulated in the suction scrubber 29, they were pumped back to the petroleum storage tank 21 by means of a return pump 39 and a return conduit 41.

Figure 2:
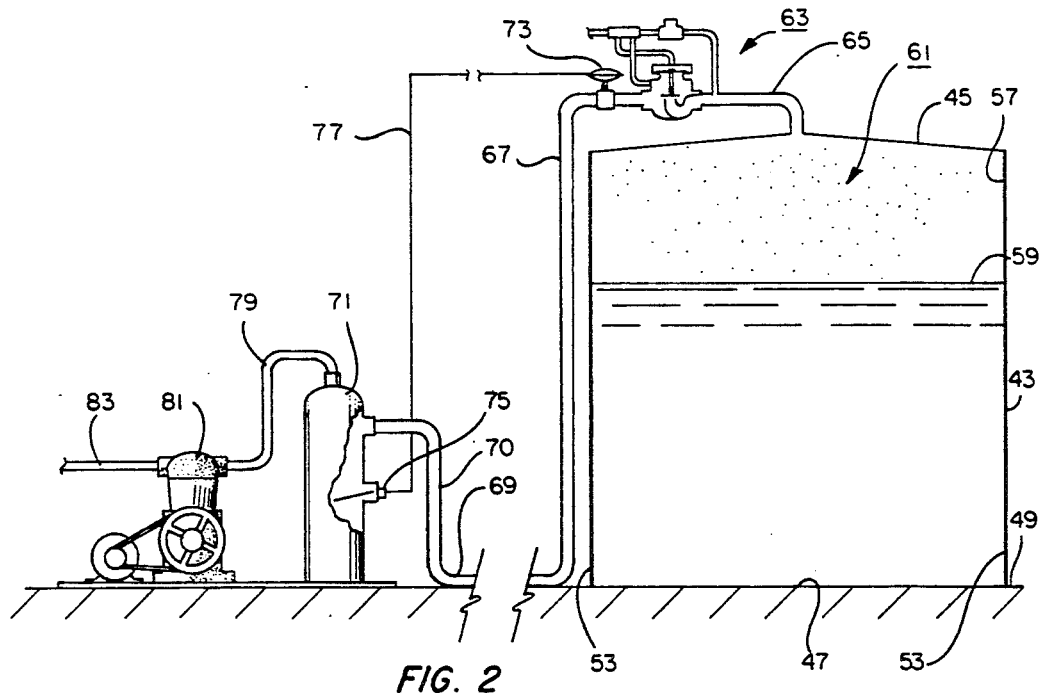
FIG. 2 is a simplified, schematic view of the device and method of the invention showing the pneumatically operated control valve.

FIG. 2 shows the device and method of the present invention. The petroleum storage tank 43 again has a top 45, a bottom 47 which rests upon the ground 49 and connecting sidewalls 51, 53. The tank interior 57 has a liquid level 59 of heavier hydrocarbons and a vapor head 61. The vapor head 61 again maintains a positive tank pressure in the range of 2 ounces per square inch.

A pneumatic control valve 63 is connected to the tank top 45 by a tank vapor line 65 and is located adjacent the connection point with the top of the tank. The tank vapor line exiting the control valve 63, illustrated as 67 in FIG. 2, passes in a generally vertical direction to the ground 49 and then has an intermediate portion 69 which runs in a generally horizontal plane, parallel to the ground 49. The intermediate portion 69 is connected to a suction scrubber unit 71 at a remote location by means of a vertical leg 70.

A pneumatic motor valve 73 is also located in the tank vapor line 67 downstream of the pneumatic control valve 63 and is actuated by a float actuated pneumatic switch 75 which outputs a control signal through a control line 77 leading to the motor valve 73.

A connecting conduit 79 connects the suction scrubber 71 to a reciprocating compressor 81. The reciprocating compressor 81, in turn, connected to a compressed vapor discharge line 83 for passing compressed vapors to a gas sales line.

Figure 3:
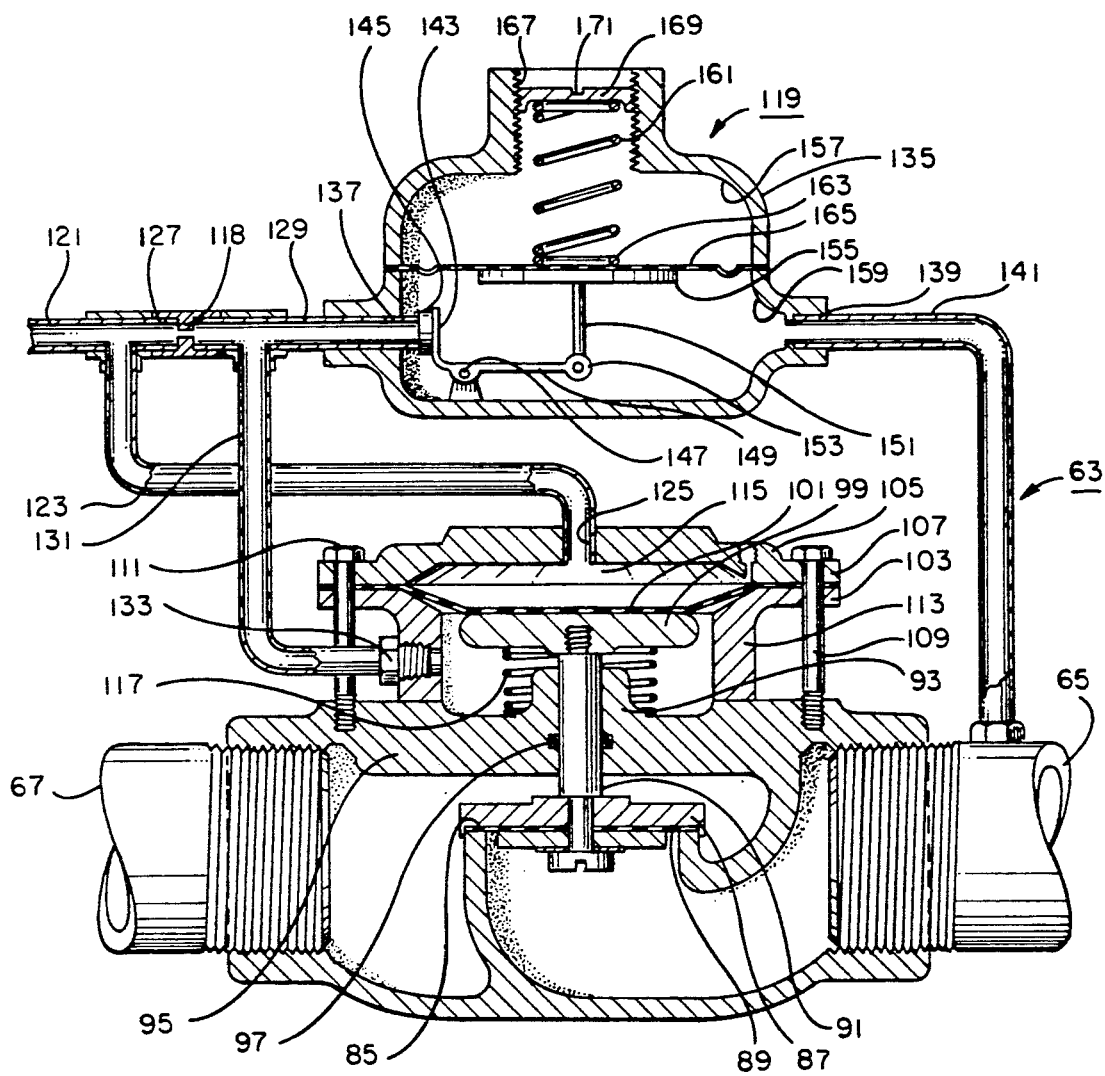
FIG. 3 is a cross-sectional view of the pneumatic control valve used in the method of the invention.

FIG. 3 shows the pneumatic control valve which makes up a portion of the improved apparatus of the invention. The pneumatic control valve 63 is connected in the tank vapor line 65 and includes an annular valve seat 85 located in the interior thereof. A main valve element 87 is provided with a flexible sealing disk 89 adapted to engage the seat 85 and, when in the seated position, close flow through the tank vapor line 65.

The valve element 87 is secured to the lower end of a valve stem 91 which extends upwardly through an axial collar 93, the collar being formed integrally with a central portion of a diagram housing or body 95.

The valve stem 91 which extends upwardly through the collar 93 is sealed off by means of suitable packing 97 which surrounds the stem and which is located within an annular groove in the bore of the collar. The upper end of the stem 91 which projects above the collar 93 has a diaphragm supporting disk 99 secured thereto, the disk being located immediately below a flexible diaphragm 101. The marginal edge portions of the diaphragm 101 overlie and rest upon the annular flange 103 and a flanged closure member 105 having an annular flange 107 is adapted to be secured to the flange 103 to firmly clamp the marginal edge of the diaphragm 101 between the flanges 103, 107. One or more elongate bolts 109, 111 extend through the flanges 103, 107 and have their lower ends threadedly engaged in the housing of the valve 63, whereby the bolts secure the diaphragm between the flanges. The interior of the diaphragm body 113 and the interior of the closure member 105 form a diaphragm chamber 115, within which the diaphragm 101 is moveable.

The diaphragm supporting disk 99 is received upon a coil spring 117 located within the diaphragm chamber 115, the spring tending to urge the diaphragm supporting disk 99 in an upward direction as viewed in FIG. 3. It will be seen that the cross-sectional area of the main operating diaphragm 101 is larger than the cross-sectional area of the valve element 87. As a result, if the same pressure is acting on the upper surface of the diaphragm that is acting on the underside of the valve, the valve element would be urged and maintained in a seated or closed position. If pressures across the diaphragm 101 are equalized, then pressure acting beneath the valve element 87 could function to raise or lift the element to unseat the element and permit flow past the valve seat 85 and through the outlet portion 67 of the tank vapor line.

In order to control pressures acting on the diaphragm 101 to permit opening and closing of the main valve element and control tank vapor, a pilot means, including pilot valve 119 is provided. The pilot means 119 is used to control the operation of the pneumatic control valve to maintain a vacuum in the tank vapor line 67 between the pneumatic control valve and the suction scrubber 71, whereby the tendency of tank vapor to liquify in the tank vapor line is decreased. The pilot means 119 is connected to a source of control gas pressure which determines a set point for the pneumatic control valve. An increase in tank vapor pressure above the set point opens the pneumatic control valve 63 and causes the reciprocating compressor 81 to pump relatively larger volumes of tank vapor. A decrease in tank vapor pressure below the set point closes the pneumatic control valve 63 and causes the reciprocating compressor 81 to pump a relatively smaller volume of tank vapor. The reciprocating compressor can be run continuously in order to maintain the desired vacuum or can be separately controlled to shut off if the vacuum increases above a certain set point.

A control gas conduit 121 has a first branch 123 which passes through a bore 125 provided in the flanged closure member 105 and to the upper region of the main diaphragm chamber 115. In this way, control gas pressure acts constantly on the upper surface 101 of the main operating diaphragm. A second branch 127 of the control gas conduit 121 is further divided into a pilot gas conduit 129 for supplying pilot gas to the pilot means 119 and a reference conduit 131 for supplying control gas to the lower region of the main diaphragm chamber by means of a threaded bore and fitting 133 received within the diaphragm body 113. A small orifice 118 is located between branch portions 127 and 129 to reduce flow of supply gas to pilot means 119.

The pilot valve 119 includes a pilot valve housing 135 with a pilot gas inlet 137 on one side and a tank gas inlet 139 on the opposite side, the tank gas inlet 139 being connected by a conduit 141 to the tank vapor line 65. The pilot valve 119 has a pilot valve element 143 including a seal region 145, a horizontal portion 149 and a vertical portion 151 connected to the horizontal portion by a pivot pin 153. The vertical portion of leg 151 is connected to a diaphragm supporting disk 155 which is mounted by the peripheral edges thereof within the pilot valve housing 135 to form upper and lower diaphragm chambers 157, 159. A coil spring 161 is mounted in the upper diaphragm 157 and has a lower extent 163 which acts upon an upper surface 165 of the flexible diaphragm. The pilot valve housing 135 has an internally threaded upper bore 167 which has matingly received therein an adjustment member, such as disk 169, the disk being provided with a slot 171, whereby a suitable tool can be used to raise and lower the adjustment member within the threaded bore 167. The threaded adjustment of the adjustment member serves to correspondingly vary the spring tension of the upper surface 165 of the flexible diaphragm, thereby providing a pressure pilot set point for the device.

The operation of the method and device of the invention will now be described. The set point for the pilot valve 119 is first set by adjusting the member 169 to provide, for example, one ounce per square inch spring pressure on the upper surface 165 of the flexible diaphragm. It will be appreciated from FIG. 3 that as the tank pressure begins to increase in the vapor line 65 and in the conduit 141 that the pressure within the lower diaphragm chamber 159 of the pilot means is increased, thereby tending to close the valve element 143 and seal the pilot gas inlet 137. This means that the control gas pressure communicated through the control gas conduit 121 at, e.g., 20 psig begins to build up in the pilot gas conduit 129. As the pressure builds up in the pilot gas conduit 129 and in the reference conduit 131, the increasing pressure acting on the lower side of the main valve element diaphragm 101 tends to urge the main valve element diaphragm upwardly as viewed in FIG. 3 to open the main valve element 87. As the main valve element opens wider, more tank gas passes through the vapor line 65 and out the exit line 67. As the corresponding tank pressure at the vapor line 65 begins to decrease, the pressure within the lower pilot diaphragm chamber 159 decreases, thereby causing the spring tension in the coil spring 161 to act upon the upper surface 165 of the pilot valve diaphragm to pivot the valve element 143 and open the pilot gas inlet 137. The control gas pressure in the pilot gas conduit 129 is then allowed to flow through the lower pilot valve diaphragm chamber 159 and through the conduit 141 to the tank vapor line portion 65. The reduced control gas pressure acting on the main valve element diaphragm 101 allows that diaphragm to move downwardly as viewed in FIG. 3, thereby tending to close the main valve element 87.

A number of advantages will be apparent in the device and method of the invention over the prior art system illustrated in FIG. 1. The prior art arrangement required the presence of an electrical pressure pilot mounted on the top of the tank. The electrical pressure pilot was expensive and posed a first or explosive hazard. The oil tank vapor line 27 in the prior art system was required to be sloped downwardly to the suction scrubber to prevent the accumulation of condensed liquids within the line. As a result, it was necessary to place the scrubber and compressor near the storage tank, increasing the fire hazard and requiring all electrical components to be explosion proofed at a considerable cost increase. In the prior art method, the flow of vapor from the reciprocating compressor to the gas sales line was an on-again, off-again flow, leading to gas metering problems. The accumulation of liquids in the suction scrubber required that the liquids be pumped back to the storage tank where the liquids again vaporized and passed out the top of the tank to the suction scrubber setting up a continuous loop.

It will be appreciated that in the device and method of the present invention, the control valve 63 and reciprocating compressor 81 are operated to maintain a vacuum in the tank vapor line 67 between the control valve and the suction scrubber 71. Liquid accumulation in the tank vapor line 67 is greatly reduced because of the vaporization effect which the vacuum causes on any hydrocarbon liquids present in the line. If liquids do accumulate in the line, they are pulled into the suction scrubber 71 by the compressor vacuum. This allows the unit to be located a greater distance from the tank 43 and eliminates the need for a constant slope of the vapor line 67. Any liquids which accumulate in the suction scrubber 71 are removed by means of the float operated liquid level switch 75. The accumulation of liquid causes the switch to open, sending a pneumatic signal through the control line 77 to the pneumatic motor valve 73 which closes the valve 73. As the valve 73 closes, the vacuum in the tank vapor line 67 is greatly increased, causing the total vaporization of any liquids present in the scrubber unit 71. The liquid vapor is compressed into the gas sales line, where it is recovered downstream. The removal of liquids within the scrubber 71 causes the float operated liquid level switch 75 to open the motor valve 73, starting the process over.

Because the pneumatic control valve does not required electricity, any fire or explosion hazard is eliminated. Vapor flow to the gas sales line is proportional to the tank vapor pressure, eliminating the on-again, off-again operation of the prior art system. Because a vacuum is maintained between the control valve and the vacuum scrubber, the tank vapor line can be run over the ground to the compressor skid an upwardly to the suction scrubber, allowing the compressor skid to be remotely located from the storage tank. Because a vacuum is maintained between the pneumatic control valve and the suction compressor, the tendency of liquids to accumulate in the tank vapor line and scrubber is greatly decreased. Any liquids that are accumulated in the scrubber are vaporized and sold as gas, eliminating the need for a liquid recalculation pump.

While the invention has been shown in only one of its forms, it is not thus limited but is susceptible to various changes and modifications without departing from the spirit thereof.

I claim:

1. A method for controlling tank vapors on a petroleum storage tank of the type having an tank vapor line running to a suction scrubber, the scrubber being connected by a conduit to a reciprocating compressor which, in turn, is connected to a compressed vapor discharge line for passing compressed vapors to a gas sales line, the method comprising the steps of:
    operating the reciprocating compressor to draw tank vapor through the suction scrubber and through the reciprocating compressor to discharge vapor through the compressed vapor discharge line;
    installing pneumatic control valve means in the tank vapor line for controlling the flow of tank vapors to the suction scrubber; and
    providing the pneumatic control valve means with pilot means for controlling the operation of the control valve means, the control valve means being operated to maintain a vacuum in the tank vapor line between the control valve means and the suction scrubber, whereby the tendency of tank vapor to liquify in the tank vapor line is decreased.

2. A method for controlling tank vapors on a petroleum storage tank of the type having an tank vapor line running to a suction scrubber, the scrubber being connected by a conduit to a reciprocating compressor which, in turn, is connected to a compressed vapor discharge line for passing compressed vapors to a gas sales line, the method comprising the steps of:
    operating the reciprocating compressor to draw tank vapor through the suction scrubber and through the reciprocating compressor to discharge vapor through the compressed vapor discharge line;
    installing pneumatic control valve means in the tank vapor line for controlling the flow of tank vapors to the suction scrubber;
    providing the pneumatic control valve means with pilot means for controlling the operation of the control valve means, the control valve means being operated to maintain a vacuum in the tank vapor line between the control valve means and the suction scrubber, whereby the tendency of tank vapor to liquify in the tank vapor line is decreased; and
    locating the suction scrubber and reciprocating compressor at a location remote from the petroleum storage tank, the tank vapor line which connects the petroleum storage tank to the suction scrubber having at least one portion thereof which runs in a horizontal plane.

3. A method for controlling tank vapors on a petroleum storage tank of the type having an tank vapor line running to a suction scrubber, the scrubber being connected by a conduit to a reciprocating compressor which, in turn, is connected to a compressed vapor discharge line for passing compressed vapors to a gas sales line, the method comprising the steps of:
    operating the reciprocating compressor to draw tank vapor through the suction scrubber and through the reciprocating compressor to discharge vapor through the compressed vapor discharge line;
    installing pneumatic control valve means in the tank vapor line, the pneumatic control valve means having a main valve element movable between open and closed positions for controlling the flow of tank vapor through the tank vapor line to the suction scrubber;
    providing the pneumatic control valve means with pilot means for controlling the operation of the control valve means, the control valve means being operated to maintain a vacuum in the tank vapor line between the control valve means and the suction scrubber, whereby the tendency of tank vapor to liquify in the tank vapor line is described, the pilot means being connected to a source of control gas pressure which determines a set point for the control valve means, whereby an increase in tank vapor pressure above the set point opens the control valve means and causes the reciprocating compressor to pump an increased mass flow rate of tank vapor, and whereby a decrease in tank vapor pressure below the set point closes the control valve means and causes the reciprocating compressor to pump a a decreased mass flow rate of tank vapor.

4. The method of claim 3, further comprising the steps of:
    installing a pneumatic motor valve in the tank vapor line downstream of the pneumatic control valve means, the pneumatic motor valve being controlled by a float actuated pneumatic switch provided in the suction scrubber, whereby any accumulation of liquid in the suction scrubber trips the float actuated pneumatic switch, thereby causing the pneumatic motor valve to close, the resulting increase in vacuum in the tank vapor line and vacuum scrubber serving to vaporize any liquids remaining in the vacuum scrubber.

5. An apparatus for controlling tank vapors on a petroleum storage tank of the type having a top, a bottom and connecting sidewalls, the tank having a tank vapor line connected at one end to the top of the tank for delivering gas to a gas sales line, the apparatus comprising:
- a suction scrubber connected to an opposite end of the tank vapor line;
- a reciprocating compressor connected to the suction scrubber by a connecting conduit, the reciprocating compressor being connected, in turn, to a compressed vapor discharge line for passing compressed vapors to the gas sales line;
- a pneumatic control valve located in the tank vapor line adjacent the connection point with the top of the tank, the pneumatic control valve having a main valve element movable between open and closed positions for controlling the flow of tank vapor through the tank vapor line to the suction scrubber;
- pilot means for controlling the operation of the pneumatic control valve to maintain a vacuum in the tank vapor line between the pneumatic control valve and the suction scrubber, whereby the tendency of tank vapor to liquify in the tank vapor line is decreased, the pilot means being connected to a source of control gas pressure which determines a set point for the pneumatic control valve, whereby an increase in tank vapor pressure above the set point opens the pneumatic control valve and causes the reciprocating compressor to pump an increased mass flow rate of tank vapor, and whereby a decrease in tank vapor pressure below the set point closes the pneumatic control valve and causes the reciprocating compressor to pump a a decreased mass flow rate of tank vapor.

6. The apparatus of claim 5, wherein the pneumatic control valve has a valve housing connected to the tank vapor line leading from the tank, the housing having a valve seat located in the interior thereof and a main valve element with a lower surface adapted to engage the valve seat to close the valve in the seated position and to open the valve in the unseated position, the main valve element being connected to the lower end of a valve stem which extends upwardly through an annular collar provided in the interior of the valve housing, the valve stem having an upper end which extends above the annular collar and which carriers a diaphragm supporting disk, the disk having secured thereto a main operating diaphragm having upper and lower surfaces, the main operating diaphragm serving to divide that portion of the valve housing above the annular collar into upper and lower regions of a main diaphragm chamber.

7. The apparatus of claim 6, wherein the cross-sectional area of the main operating diaphragm is larger than the cross-sectional area of the main valve element, whereby the same pressure acting on the upper surface of the main operating diaphragm also acting on the lower surface of the main valve element tends to maintain the main valve element in the closed position.

8. The apparatus of claim 7, further comprising:
- a control gas conduit having a first and second branches, the first branch being connected to the upper region of the main diaphragm chamber, whereby the control gas pressure acts constantly on the upper surface of the main operating diaphragm.

9. The apparatus of claim 8, wherein the second branch of the control gas conduit is further divided into a pilot gas conduit for supplying pilot gas to the pilot means and a reference conduit for supplying control gas to the lower region of the main diaphragm chamber.

10. The apparatus of claim 9, wherein the pilot means comprises a pilot valve having a pilot valve housing with a pilot gas inlet connected to the pilot gas conduit and a tank gas inlet which communicates with the tank vapor line, the pilot valve having a pilot valve element reciprocally mounted in the interior thereof, the valve element being reciprocable between a closed position in which the pilot valve element closes the pilot gas inlet and an open position.

11. The apparatus of claim 10, wherein the pilot valve element is pivotally connected to a diaphragm supporting disk which has secured thereto a flexible diaphragm, the flexible diaphragm being mounted within the pilot valve housing to divide the housing interior into an upper pilot housing region and a lower pilot housing region, and wherein a coil spring is mounted in the upper pilot housing region, the coil spring having a lower extent which acts upon an upper surface of the flexible diaphragm.

12. The apparatus of claim 11, wherein the pilot valve housing has a threaded upper bore which has matingly received therein an adjustment member, the threaded adjustment of the adjustment member serving to correspondingly vary the spring tension on the upper surface of the flexible diaphragm.

13. An apparatus for controlling tank vapors on a petroleum storage tank of the type having a top, a bottom and connecting sidewalls, the tank having a tank vapor line connected at one end to the top of the tank for delivering gas to a gas sales line, the apparatus comprising:
- a suction scrubber connected to an opposite end of the tank vapor line;
- a reciprocating compressor connected to the suction scrubber by a connecting conduit, the reciprocating compressor being connected, in turn, to a compressed vapor discharge line for passing compressed vapors to the gas sales line;
- a pneumatic control valve located in the tank vapor line adjacent the connection point with the top of the tank, the pneumatic control valve having a main valve element movable between open and closed positions for controlling the flow of tank vapor through the tank vapor line to the suction scrubber.
- pilot means for controlling the operation of the pneumatic control valve to maintain a vacuum in the tank vapor line between the pneumatic control valve and the suction scrubber, whereby the tendency of tank vapor to liquify in the tank vapor line is decreased, the pilot means being connected to a source of control gas pressure which determines a set point for the pneumatic control valve, whereby an increase in tank vapor pressure above the set point opens the pneumatic control valve and causes the reciprocating compressor to pump an increased mass flow rate of tank vapor, and whereby a decrease in tank vapor pressure below the set point closes the pneumatic control valve and causes the reciprocating compressor to pump a a decreased mass flow rat of tank vapor; and a pneumatic motor valve located in the tank vapor the downstream of the pneumatic control valve, the pneumatic motor valve being controlled by a float actuated pneumatic switch provided in the suction scrubber, whereby any accumulation of liquid in the suction scrubber trips the float actuated pneumatic switch, thereby causing the pneumatic motor valve to close, the resulting increase in vacuum in the tank vapor line and vacuum scrubber serving to vaporize any liquids present in the vacuum scrubber.

14. The apparatus of claim 13, wherein the vacuum scrubber and reciprocating compressor are located at a location remote from the petroleum storage tank, the tan vapor line which connects the petroleum storage tank to the suction scrubber having at least one portion thereof which runs in a horizontal plane.

* * * * *